(12) United States Patent
Palrose et al.

(10) Patent No.: US 6,752,467 B1
(45) Date of Patent: Jun. 22, 2004

(54) VACUUM TRUCK DUMP CONTAINER APPARATUS

(75) Inventors: Peter Oliver Palrose, Jacksonville, FL (US); Thomas W. Armstrong, Orange Park, FL (US)

(73) Assignee: Vac-Con, Inc., Green Cove Springs, FL (US)

( * ) Notice: Subject to any disclaimer, the term of this patent is extended or adjusted under 35 U.S.C. 154(b) by 10 days.

(21) Appl. No.: 10/075,141

(22) Filed: Feb. 14, 2002

(51) Int. Cl.[7] .................................................. B60P 1/34
(52) U.S. Cl. ..................... 298/11; 414/471; 298/22 R
(58) Field of Search .......................... 298/11, 12, 17.5, 298/17.8, 22 R; 414/469, 471, 477

(56) References Cited

U.S. PATENT DOCUMENTS

| | | | |
|---|---|---|---|
| 1,597,544 A | * | 8/1926 | Rodenhausen ............... 298/11 |
| 2,494,377 A | * | 1/1950 | Cresci ........................ 298/11 |
| 3,066,984 A | * | 12/1962 | Hori ............................ 298/11 |
| 3,514,000 A | * | 5/1970 | Kolling et al. ............. 414/471 |
| 3,647,098 A | | 3/1972 | Smith |
| 4,042,138 A | | 8/1977 | Arvidsson |
| 4,193,159 A | | 3/1980 | Beard, III |
| 4,531,780 A | | 7/1985 | Boczkiewicz |
| 4,951,999 A | * | 8/1990 | Rudolph et al. ............. 298/11 |
| 4,989,917 A | * | 2/1991 | Schmidt, Jr. ................ 298/11 |
| 5,044,861 A | | 9/1991 | Kirchhoff et al. |
| 5,580,211 A | * | 12/1996 | Mengel ....................... 414/812 |

* cited by examiner

Primary Examiner—Dean J. Kramer
(74) Attorney, Agent, or Firm—Schiff Hardin LLP

(57) ABSTRACT

A truck debris collection container mounting apparatus comprising a truck frame, a support frame moveably mounted to the truck frame, a debris collection container pivotally mounted to the support frame, a lifting device to vertically and horizontally move the support frame relative to the truck frame, and a device to rearwardly tilt the debris collection container. The support frame is movably attached to the truck frame via a plurality of extendable lifts and support links, which allows the debris collection container to be lifted up and rearward from the truck frame.

10 Claims, 4 Drawing Sheets

VACUUM TRUCK DUMP CONTAINER APPARATUS

The present invention relates generally to the field of truck debris collection containers. More specifically, the present invention relates to the field of mounting truck debris collection containers on a movable support platform with the ability to further tilt the truck debris collection container towards the back through the use of pivotal attachments in order to facilitate the emptying of debris from within the truck debris collection container.

BACKGROUND OF THE INVENTION

Vacuum debris collection trucks are commonly used to vacuum streets and parking lots, curbs and gutters, drainage catch basin, storm water and sanitary systems, or any other area that can be vacuumed and/or cleaned using the combination of a vacuum system and high pressure water. The trucks typically either have a manually operated hose attachment which allows an operator to easily and conveniently direct the vacuum pressure to a desired location, for example in a catch basis, ditch or curb and gutter.

In order to facilitate the vacuum truck collection of vacuumed debris, vacuum trucks commonly have debris collection containers located on the vacuum truck. By attaching the debris collection container to the vacuum truck, the vacuum trucks thus have a mobile operation and can be used anywhere. Once the debris collection container is filled with vacuumed debris, however, the operator must empty his debris payload.

It has been a continuous problem in the vacuum truck debris collection industry to efficiently, conveniently, cleanly and easily empty the collected debris payload in a vacuum truck debris collection container. Inherent with the vacuum pressures associated with a vacuum truck, the debris collection containers are cylindrical in shape and are constructed of heavy-gauge steel. This thick-gauge steel makes the vacuum truck debris collection container extremely heavy and hard to manage. As such, it has been a generally well-known practice in the industry to pivotally mount such a debris collection container to the frame of the vacuum truck wherein allowing the ability to rearwardly tilt the container with a hydraulic lift so that the debris can easily flow out of the container using gravity. When the debris collection container is rearwardly tilted, a hinged door on the back of the debris collection container is opened and the debris exits the container due to gravity.

However, by simply rearwardly tilting the debris collection container on the frame, conventional containers are severely limited by not being able to properly empty their debris payload into an independent, outside collection receptacle. This is due to the fact that the vacuum truck frame is obtrusive and does not permit the operator to position the debris collection container close to the outside collection receptacle. As such, when a conventional debris collection container is tilted, its debris payload quite often misses its exit target, thus creating an undesirable mess.

Another method that has been widely, yet unfavorably, used is fixedly attaching the debris collection container to the vacuum truck frame. In this configuration, the debris collection container does not tilt. As such, in order to facilitate the emptying of the debris collection container, the operator must directly enter the debris collection container and manually empty the container, such as with using a common push broom, shovel, or hydraulically operated ejector plate.

U.S. Pat. No. 4,193,159 to Beard, III, issued on Mar. 18, 1980, discloses a mobile cleaning apparatus for removing debris from the surface of parking lots and the like. The '159 patent discloses a fixedly attached debris collection container to a movable frame. The movable frame positions the debris collection container away from a predetermined extension to expose a trap door on the underside of the container. Once the debris collection container is extended, the debris within the container is emptied by using the pivotally attached door located on the underside of the debris collection container. However, unlike the present invention, a limitation of the '159 patent is that the collection container does not disclose the ability to rearwardly tilt the debris collection container, thus not allowing gravity to force all of the debris from the collection container. Furthermore, by placing the emptying door on the underside of the debris collection container, the container is not well suited to accept small particulate or liquid debris due to easy leakage and difficult opening of the underside door. The present invention overcomes these limitations by, for example, pivotally mounting the debris collection container to the support frame, thus allowing the container to tilt in a rearward fashion to facilitate and ease the removal of all debris from within the container by gravitational force. Furthermore, the present invention, for example, provides a door on the rear of the unit, thus being more suited for easy debris evacuation and small particulate and liquid debris handling.

U.S. Pat. No. 3,647,098 to Smith, issued on Mar. 7, 1972, discloses a dump body pivot system and lock. The '098 patent pivotally attaches a debris collection container to a fixed truck frame. The collection container has the ability to be tilted in a rearward direction by hydraulic cylinders, thus facilitating the emptying of debris within the collection container. However, unlike the present invention, a limitation to the '098 patent is that it does not have the ability to move the container and frame in a vertical or horizontal fashion. As such, the container is extremely limited with the methods of emptying the debris container, such as, for example and as stated earlier, not properly placing the debris exit location over an outside debris receptacle, thus creating an undesirable mess upon emptying the debris from the debris collection container. The present invention overcomes this limitation by, for example, allowing the pivotally mounted debris collection container to be moved in both a vertical and horizontal direction prior to rearwardly titling the container to empty its debris payload. This allows the present invention's debris exit location to be properly aligned above an outside debris collection container prior to facilitating the emptying process.

U.S. Pat. No. 4,042,138 to Arvidsson, issued on Aug. 16, 1977, discloses a garbage container carrier configured in a towable trailer. The '138 patent has a debris container pivotally mounted on a trailer which allows the container to be rearwardly titled when it is desired to empty the container. Furthermore, the '138 patent discloses lockable legs which lock the container in a rearwardly tilted position to facilitate the safe entry of a person into the container in order to speed clean up. A limitation in the '138 patent, as within the previously discussed '098 patent, is that, unlike the present invention, it does not have the ability to manipulate the vertical and horizontal placement of the exit location of the debris container. The present invention overcomes this limitation by, for example, allowing the pivotally mounted debris container to move in a vertical and horizontal plane prior to rearwardly tilting the container to facilitate debris removal.

U.S. Pat. No. 4,531,780 to Boczkiewicz, issued on Jul. 20, 1985, discloses a lift mechanism for a dump truck. The '780 patent uses a conventional debris container pivotally mounted on a truck frame. A hydraulic lift mechanism is used to either rearwardly or forwardly tilt the debris container, depending upon the circumstance. However, unlike the present invention, a limitation to the '780 patent is that it does not have the ability to move the debris container in either a vertical or horizontal manner prior to tilting the container. The present invention overcomes this limitation by, for example, allowing the pivotally mounted debris container to move in a vertical and horizontal plane prior to rearwardly tilting the container to facilitate debris removal.

U.S. Pat. No. 5,044,861 to Kirchhoff et al., issued on Sep. 3, 1991, discloses a garbage collection truck having a replaceable container which is reciprocally mounted on a tiltable frame. Like the above-discussed patents, the '861 patent pivotally mounts the frame, which supports a debris container. Furthermore, the '861 patent has the ability to move the frame, which supports the debris collection container, in a horizontal rearward direction prior to rearwardly tilting the debris collection container mounting frame. A limitation to the '861 patent is that unlike the present invention, the mounting frame does not have the ability to move in both a vertical and horizontal direction prior to rearwardly titling the debris container, thus severely limiting its debris emptying ability. Furthermore, the '861 patent is intended to simply carry the debris container to a designated location wherein the container is unloaded from the truck assembly. The present invention overcomes these limitations by, for example, allowing the pivotally mounted debris container to move in a vertical and horizontal plane prior to rearwardly tilting the container to facilitate debris removal. Furthermore, the present invention fixedly attaches the debris collection container to the support frame wherein the container does not require unloading from the truck in order to facilitate debris emptying.

The preferred embodiment of the present invention overcomes the limitations of the prior art by allowing the frame, which the debris collection container is pivotally mounted to, to move in both a vertical and rearward fashion prior to implementing a rearward tilt to the debris collection container.

The preferred embodiment would allow the debris tank to be dumped in the lowered position without raising and moving the collection debris container which is standard practice in vacuum truck collection, yet would have the ability to be raised up and over a roll off type container, allowing for easier dumping of the debris from the collection container without excess mess.

The present invention overcomes the disadvantages and/or shortcomings of known prior art truck mounted debris collection containers and provides significant improvements thereover.

OBJECTS OF THE INVENTION

An object of the present invention is to provide a truck with an attached debris collection container and having an improved ability to securely, safely and efficiently empty its debris container load into an independent, outside emptying container.

Yet another object of the present invention is to achieve the above-mentioned object by allowing the debris collection container operator to move the debris collection container in a horizontal and/or vertical orientation via pivotal attachments and hydraulic pistons prior to rearwardly tilting the debris collection container to empty the container payload.

And yet another object of the present invention is to provide a platform capable of supporting a heavy-gauged steel vacuum debris collection container while achieving the above-mentioned objects Numerous other objects, features and advantages of the present invention will become readily apparent through the detailed description of the preferred embodiment, drawings and the claims.

SUMMARY OF THE INVENTION

The present invention comprises an improved apparatus to easily and controllably empty the debris payload in a truck debris collection container by allowing the truck operator to move the debris collection container in a horizontal and/or vertical orientation prior to rearwardly titling the debris collection container. The preferred embodiment of the present invention has the ability of vertically and horizontally moving the debris collection container of a vacuum truck prior to rearwardly tilting the same. It should be understood, however, that the preferred embodiment's application to a vacuum truck debris collection container is not limiting, wherein the present invention is applicable to all types of debris collection containers, including pressure vessels.

By having the ability to move the debris collection container in a horizontal and vertical orientation, the present invention allows an operator to properly position the debris payload exit location of the debris collection container over an outside disposal location prior to dumping. This ability allows the proper and tidy dumping of the collected debris payload, thus dramatically decreasing debris over-spill and unnecessary mess.

The preferred embodiment of the present invention pivotally mounts a truck debris collection container to a horizontally and vertically movable frame, relative to the truck frame. The operator has the ability to selectively place the debris collection container in a varying degree of either horizontal or vertical placement, thus allowing the debris payload exit location to be selectively and precisely placed above an outside debris collection receptacle. Once the debris payload exit location is properly placed, the operator rearwardly tilts the debris collection container to facilitate the debris payload removal through the use of gravity. As such, when the debris collection container is rearwardly titled, the collected debris will slide out of the back of the debris collection container, preferably through the use of a pivotally mounted rear door.

Once the debris payload has been evacuated, the debris collection container can be returned to its normal collection position.

DESCRIPTION OF THE DRAWINGS

A preferred embodiment of the present invention is described herein with reference to the drawing wherein.

DETAILED DESCRIPTION OF THE PREFERRED EMBODIMENT

While the invention is susceptible of embodiment in many different forms, there will be described herein in detail, preferred and alternate embodiments of the present invention. It should be understood, however, that the present disclosure is to be considered an exemplification of the principles of the invention and is not intended to limit the spirit and scope of the invention and/or claims of the embodiments illustrated.

The present invention is an improved truck debris collection container mounting apparatus. The preferred embodiment of the present invention provides the ability of vertically and horizontally moving the debris collection container of a vacuum truck prior to rearwardly tilting the same. It should be understood, however, that the preferred embodiment's application to a vacuum truck debris collection container is not limiting, wherein the present invention is applicable to all types of debris collection containers, including pressure vessels.

The present invention allows a truck operator to selectively extend a frame, to which a debris collection container is pivotally mounted, in a vertical and horizontal position prior to rearwardly tilting the debris collection container, thus properly positioning the debris collection container emptying means above an outside debris receptacle. The preferred embodiment of the present invention uses a pivotally mounted rear door for the emptying means. This improves the efficiency and speed of emptying the debris collection container and reduces the likelihood of creating a mess and outside receptacle overflow.

Figure 1:
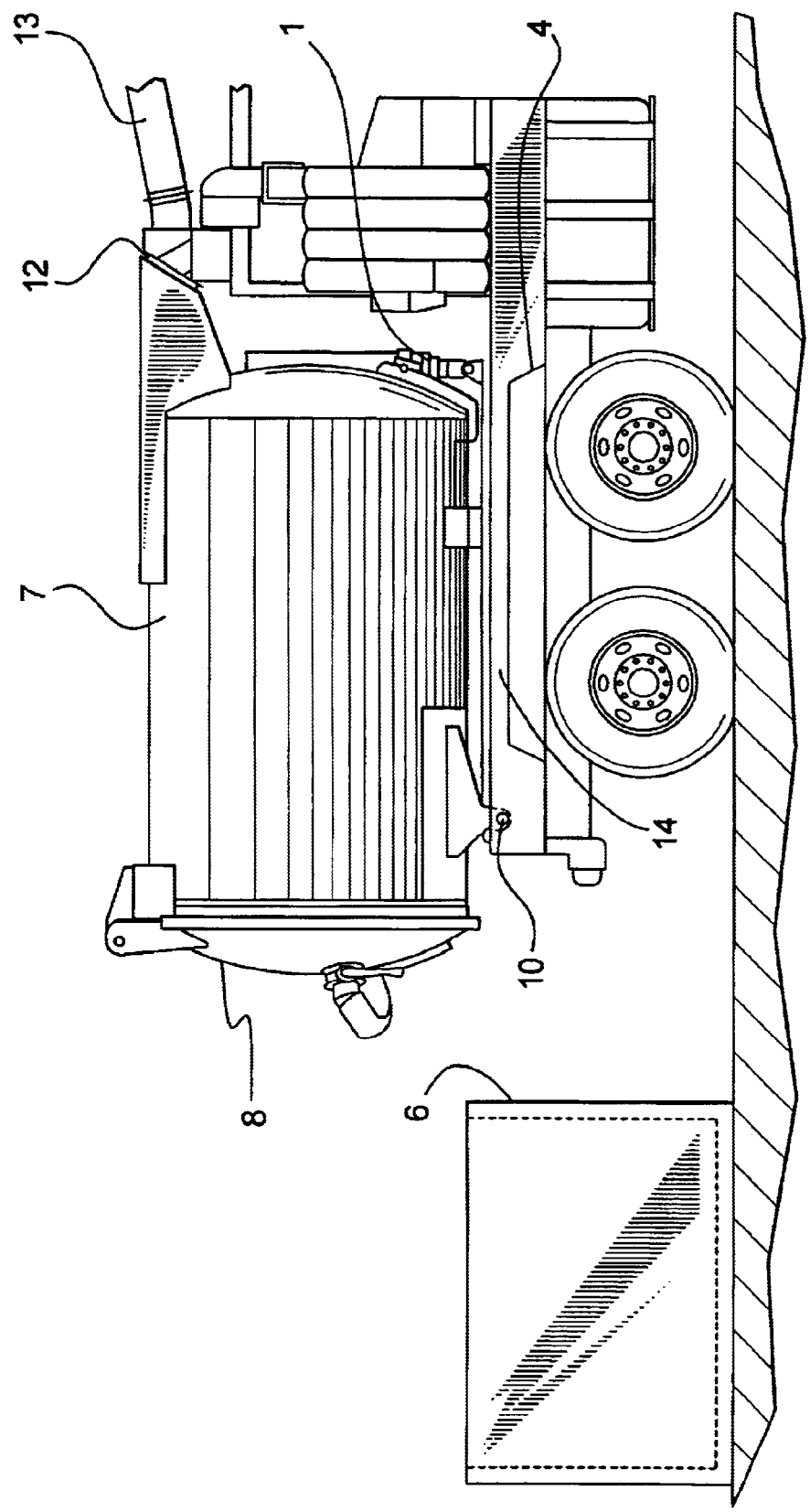
FIG. 1 is a side view of the present invention illustrating the vacuum truck debris collection container in its fully retracted position, ready to collect debris.
Figure 2:
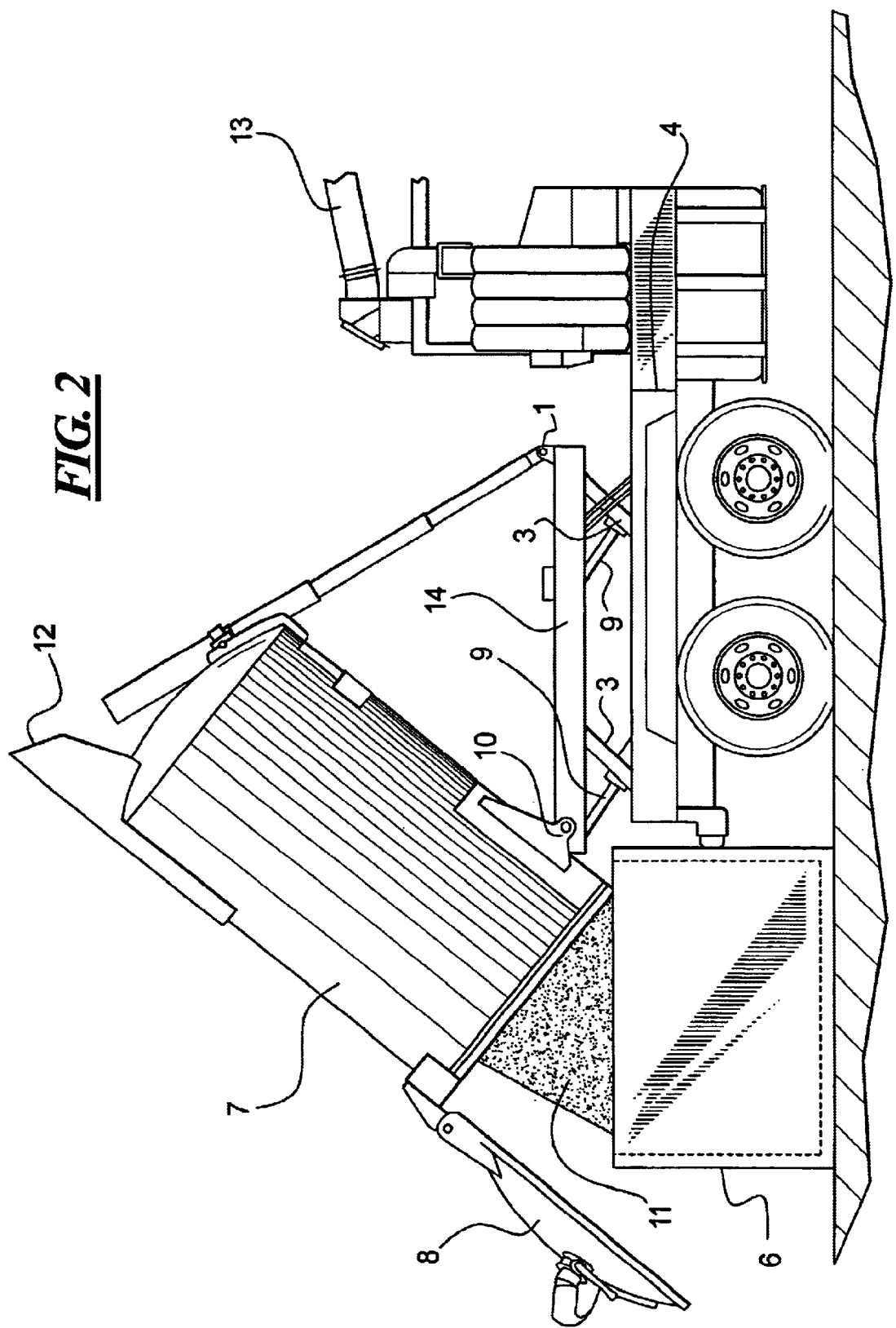
FIG. 2 is a side view of the present invention depicting the vacuum truck collection container pivotally mounted and rearwardly titled on the horizontally and vertically extended container frame, in the process of emptying its debris payload into an outside debris receptacle.

Referring to FIGS. 1 and 2, the present invention is an improved truck debris collection container mounted on a movable support frame. In the preferred embodiment, a conventional debris collection container 7 is pivotally mounted via a pivot assembly 10 to a container support frame 14. The underside or base of the frame 14 is attached to a means of vertically and horizontally moving the frame. The preferred means of vertically and horizontally moving the frame pivotally attaches one end of at least one hydraulic piston 9 and one end of a plurality of parallel support legs 3 to the container support frame or base 14. The opposite end of the hydraulic piston 9 and support legs 3 are attached to the vacuum truck frame 4. Preferably, there are two legs 3 and a piston 9 on each side of the frame 14, for a total of four legs 3 and two pistons 9. The pistons 9 and legs 3 are mounted in an opposite manner or in a criss-cross arrangement, wherein the left ends of the legs 3 are mounted to truck frame 4 while the left end of piston 9 is mounted to frame 14, and the right ends of legs 3 are mounted to the frame 14 while the right end of piston 9 is mounted to truck frame 4, as best seen in FIG. 3.

The container support frame 14 subsequently has the ability of being selectively moved in both a horizontal and/or vertical direction, relative to the vacuum truck frame 4, through the use of the hydraulic piston 9 and the plurality of parallel support legs 3. It should be understood however that the means for moving the frame could take any suitable form, not limited to a hydraulic piston, such as for example, a pneumatic lifting device, and electrical lifting device, a mechanical lifting device, an electromechanical lifting device, among many others.

When the hydraulic piston 9 is activated and thus extended, the container support frame 14 is automatically moved in a vertical and horizontal direction, relative to the vacuum truck frame 4. The hydraulic piston 9 can be selectively extended a desired distance until the rear of the debris collection container 7 is positioned above an exterior debris receptacle 6 as shown in FIG. 2. This thus allows the vacuum truck operator to further back the vacuum truck closer to the exterior debris receptacle 6 if necessary in order to facilitate debris emptying.

Figure 3:
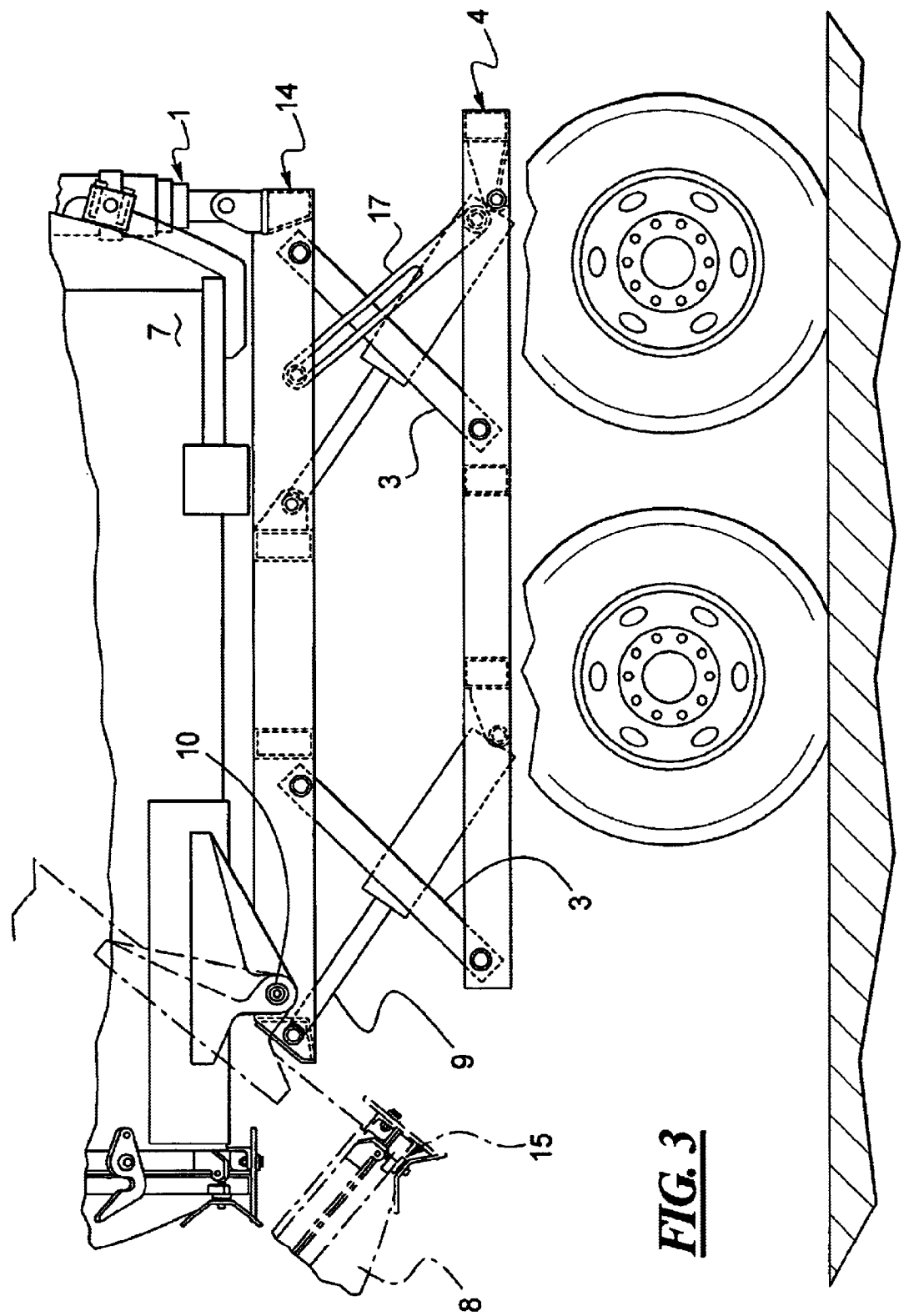
FIG. 3 is an enlarged side view of the vacuum truck debris collection container showing the frame of the collection unit in its vertically raised, and horizontally rearward position.
Figure 4:
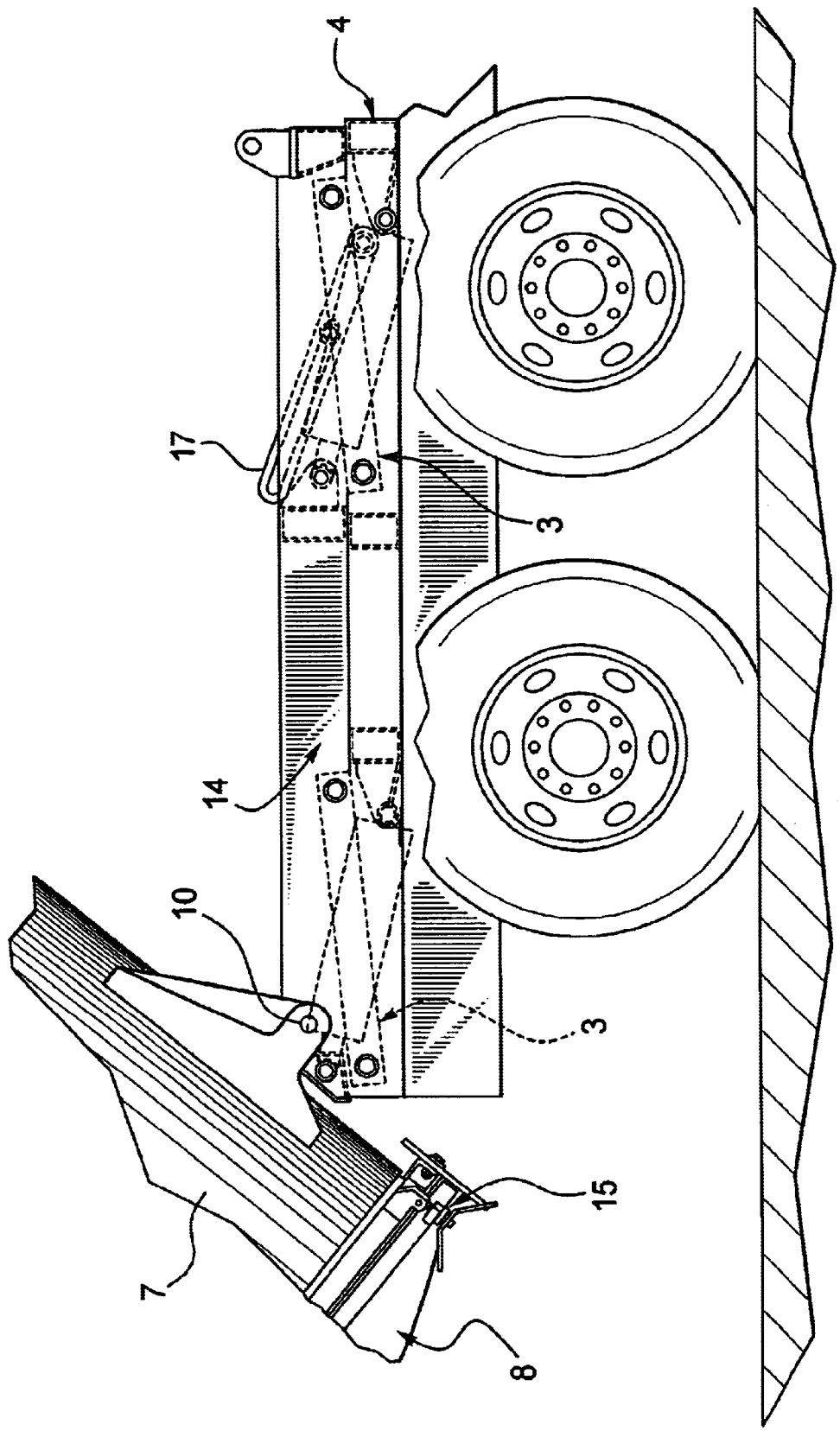
FIG. 4 is an enlarged side view of the vacuum truck debris collection container showing the frame and collection unit in its fully retracted position.

Referring to FIGS. 3 and 4, once the desired location and position of the debris collection container 7 has been achieved, and since the debris collection container 7 is connected to the container support frame 14 with a pivotal mount 10, the operator has the ability to facilitate the emptying of the debris collection container 7 by using a means to rearwardly tilt the debris collection container as shown in FIGS. 2 and 3. The preferred embodiment of the present invention uses at least one hydraulic tilt piston 1, or any suitable lifting device, whereby when extending the hydraulic tilt piston 1, the debris collection container 7 achieves a rearward tilt, as can be seen in FIG. 2. This inclines the debris collection container 7 to an appropriate angle, thus allowing gravity to force any debris payload 11 within the debris collection container 7 towards the rear and out of the debris collection container 7.

The preferred embodiment of the present invention uses a hydraulic piston 15 to open a pivotally mounted rear door 8 prior to extending the hydraulic tilt piston 1. An alternate embodiment of the present invention uses a self-opening, pivotally mounted rear door 8, thus automatically opening due to its own weight and the weight of the debris payload 11, when the debris collection container 7 is in an inclined position.

Upon the completion of emptying the debris collection container 7 of any debris payload 11, the operator can return the debris collection container 7 to its fully retracted collecting position by releasing the hydraulic tilt piston 1, thus lowering the debris collection container 7 to be supportedly mounted on the container support frame 14. Once the debris collection container 7 is supported in its down position, the container support frame 14 can be lowered and moved forward by releasing the hydraulic lifts 9.

Additionally, the present invention includes a safety feature in the form of at least one slotted link 17, preferably at least one on each side of the truck frame and container support frame. As can be seen, the slotted link 17 is mounted proximate the hydraulic lift 9 and acts as a safety stop in case the hydraulic cylinder piston rod fails.

In an alternative embodiment of the present invention, it is contemplated that the frame 14 can be mounted for horizontal and/or vertical movement, independently. This alternative embodiment of the present invention would use one or more hydraulic, pneumatic or electro-mechanic pistons to allow for vertical movement independent of horizontal movement of the collection container. For example, frame 14 could be lifted vertically, while container 7 could be suitably mounted to frame 14 for horizontal movement. These alternatives would allow for horizontal or vertical movement that is completely independent of the need for the combination thereof.

The foregoing specification describes only the preferred and alternate embodiments of the invention as shown. Other embodiments besides the above may be articulated as well. The terms and expressions therefore serve only to describe the invention by example only and not to limit the invention. It is expected that others will perceive differences, which while differing from the foregoing, do not depart from the spirit and scope of the invention herein described and claimed.

What is claimed is:

1. A truck debris collection container mounting apparatus for mounting a truck debris collection container to a truck frame comprising:

a support frame for mounting said debris collection container comprising solely horizontal components, the support frame configured to remain parallel to a horizontal component of the truck frame throughout its operation;

a debris collection container, said debris collection container having a front end and a back end, said back end being pivotally mounted to said support frame;

a support frame vertical and horizontal movement mechanism that comprises at least one linear extension mechanism having a first end and a second end, said first end being attached to said truck frame, and said second end being operatively attached to said support frame; and a debris collection container rearward tilting mechanism.

2. The apparatus as claimed in claim 1 wherein said debris collection container is a vacuum truck debris collection container.

3. The apparatus as claimed in claim 1 wherein said debris collection container is a pressure vessel.

4. The apparatus as claimed in claim 1 wherein said debris collection container further comprises a rear door, said rear door being pivotally attached to said back end of said debris collection container.

5. The apparatus as claimed in claim 1 wherein said vertical and horizontal movement mechanism comprises:

at least one extendable piston, said piston having a first end and a second end, said first end being attached to said truck frame, said second end being operatively attached to said support frame; and a plurality of support legs, said support legs each having a top end and a bottom end, said bottom end of each said support leg being pivotally attached to said truck frame, said top end of each said support leg being pivotally attached to said underside of said support frame.

6. The apparatus as claimed in claim 1 wherein said rearward tilting mechanism comprises an extendable piston, said piston having a first end and a second end, said first end being attached to said support frame, said second end being attached to said front end of said debris collection container.

7. A method of emptying the contents from within a truck mounted debris collection container, comprising the steps of:

pivotally mounting a back end of said debris collection container onto a support frame comprising solely horizontal components;

attaching a debris collection container tilting mechanism to a front end of said debris collection container;

mounting said support frame to a truck frame via a support frame horizontal and vertical movement mechanism;

rearwardly and vertically moving said support frame relative to said truck frame until said support frame is at a desired rearward and vertical location utilizing at least one linear extension mechanism having a first end and a second end, said first end being attached to said truck frame, and said second end being operatively attached to said support frame, the support frame remaining horizontal throughout its operation; and tilting said debris collection container in a rearward direction.

8. The method as claimed in claim 7 wherein said tilting mechanism comprises at least one extendable piston, said piston having a first end and a second end, said first end being operatively attached to said front end of said debris collection container, said second end being operatively attached to said support frame.

9. The method as claimed in claim 7 wherein said support frame horizontal and vertical movement mechanism comprises at least one extendable piston and a plurality of support legs.

10. The method as claimed in claim 7 wherein said debris collection container further comprises a rear door, said rear door being pivotally mounted to said back end of said debris collection container.

* * * * *

UNITED STATES PATENT AND TRADEMARK OFFICE
CERTIFICATE OF CORRECTION

PATENT NO. : 6,752,467 B1
DATED : June 22, 2004
INVENTOR(S) : Peter Oliver Palmrose and Thomas W. Armstrong It is certified that error appears in the above-identified patent and that said Letters Patent is hereby corrected as shown below:

Title page,
Items [12] and [75], inventor's name, replace "Palrose" with -- Palmrose --.

Signed and Sealed this

Twenty-fourth Day of August, 2004

JON W. DUDAS
*Director of the United States Patent and Trademark Office*